US011572719B2

(12) United States Patent
Hwang (10) Patent No.: US 11,572,719 B2
(45) Date of Patent: Feb. 7, 2023

(54) OPENING APPARATUS OF A HOOD OF A VEHICLE FOR EMERGENCY ESCAPE

(71) Applicants: HYUNDAI MOTOR COMPANY, Seoul (KR); KIA MOTORS CORPORATION, Seoul (KR)

(72) Inventor: Jeong-Su Hwang, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 292 days.

(21) Appl. No.: 16/677,109

(22) Filed: Nov. 7, 2019

(65) Prior Publication Data

US 2020/0181954 A1 Jun. 11, 2020

(30) Foreign Application Priority Data

Dec. 5, 2018 (KR) .................. 10-2018-0155404

(51) Int. Cl.
*B62D 25/12* (2006.01)
*E05B 79/20* (2014.01)
(Continued)

(52) U.S. Cl.
CPC ............. *E05B 83/26* (2013.01); *B62D 25/12* (2013.01); *E05B 79/20* (2013.01); *E05B 83/24* (2013.01); *E05Y 2900/536* (2013.01)

(58) Field of Classification Search
CPC .......... E05B 83/26; E05B 79/20; E05B 83/24; E05B 77/02; E05B 83/243; E05B 85/01; E05B 79/16; E05B 79/22; B62D 25/12; B62D 25/10; E05Y 2900/536; B60R 21/02; B60R 21/00
See application file for complete search history.

(56) References Cited

U.S. PATENT DOCUMENTS 4,863,122 A * 9/1989 Bolang .................. B64C 13/24
244/221
8,798,858 B2 * 8/2014 Zysk ....................... E05B 81/56
307/326
(Continued)

FOREIGN PATENT DOCUMENTS

JP H0524840 U 3/1993
JP 2004203250 A 7/2004
(Continued)

OTHER PUBLICATIONS

Office Action cited in Chinese patent application No. 201911147214.0; dated Dec. 5, 2022; 13 pp.

*Primary Examiner* — Kristina R Fulton
*Assistant Examiner* — Thomas L Neubauer
(74) *Attorney, Agent, or Firm* — Lempia Summerfield Katz LLC (57) ABSTRACT

An opening apparatus of a hood of a vehicle for emergency escape includes a hood latch and a safety hook, which constrains a striker formed on the hood to open and close the hood, which opens and closes a front trunk in a vehicle equipped with the front trunk. The opening apparatus includes an emergency lever configured to be installed in the front trunk and an emergency opening mechanism configured to operate the hood latch and the safety hook simultaneously when the emergency lever is operated to release the constraint of the striker.

14 Claims, 7 Drawing Sheets

(51) Int. Cl.
*E05B 83/24* (2014.01)
*E05B 83/26* (2014.01)

(56) References Cited

U.S. PATENT DOCUMENTS

| | | |
|---|---|---|
| 10,273,726 B2 | 4/2019 | Park |
| 11,007,972 B2 * | 5/2021 | Miller .................... B60R 21/38 |
| 2003/0081995 A1 | 5/2003 | Acciacca |
| 2005/0077734 A1 | 4/2005 | Lim |
| 2012/0161453 A1 * | 6/2012 | Zysk ....................... E05B 83/24 |
| | | 292/21 |
| 2015/0345186 A1 | 12/2015 | Park |
| 2017/0101060 A1 | 4/2017 | Keimig |

FOREIGN PATENT DOCUMENTS

| | | | | |
|---|---|---|---|---|
| JP | 2007045264 A | | 2/2007 | |
| KR | 20020052079 A | | 7/2002 | |
| KR | 200200552079 | * | 7/2002 | ............ B62D 25/12 |
| KR | 101560979 B1 | | 10/2015 | |

* cited by examiner

FIG.8

OPENING APPARATUS OF A HOOD OF A VEHICLE FOR EMERGENCY ESCAPE

CROSS-REFERENCE TO RELATED APPLICATIONS

This application claims priority to Korean Patent Application No. 10-2018-0155404, filed on Dec. 5, 2018, which is incorporated herein by reference in its entirety.

BACKGROUND OF THE DISCLOSURE

Field of the Disclosure

Various embodiments of the present disclosure relate to an opening apparatus of a hood of a vehicle for emergency escape for simultaneously operating a hood latch and a safety lever in a front trunk space of the vehicle to allow the hood of the vehicle to be opened.

Description of Related Art

A vehicle is usually provided with a passenger compartment in which passengers sit, an engine compartment positioned in front of the vehicle compartment, and a trunk space positioned behind the passenger compartment.

Figure 1:
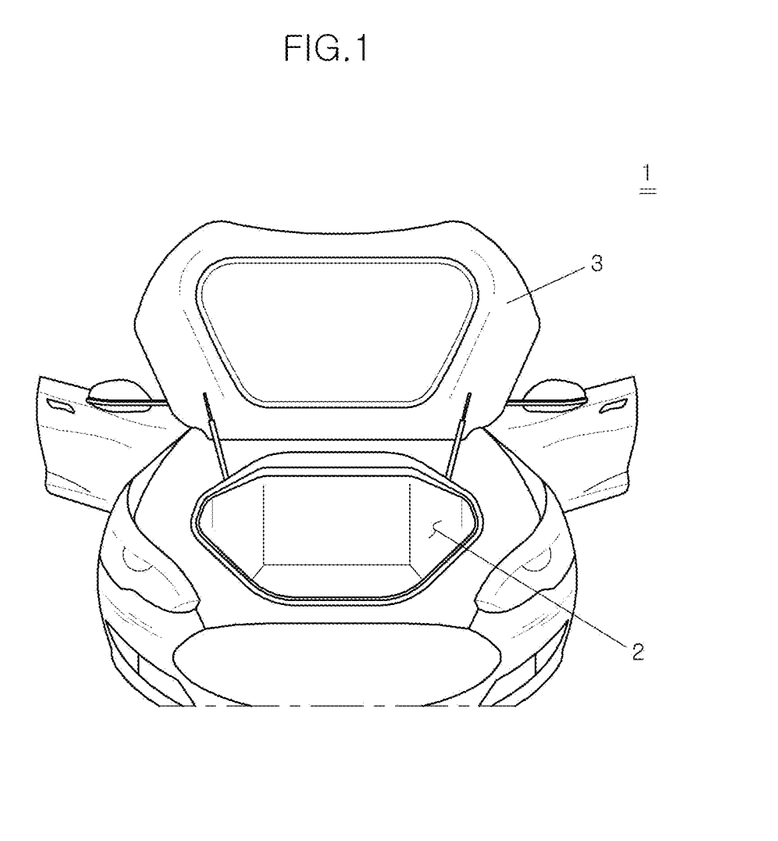
FIG. 1 is a perspective view showing a vehicle in which a front trunk space is formed.

In most vehicles to which an engine is applied, the engine compartment is provided with an engine, a transmission, and the like. Referring to FIG. 1, the engine compartment is provided with a hood 3, which opens and closes an upper part of the engine compartment for maintenance.

Figure 2:
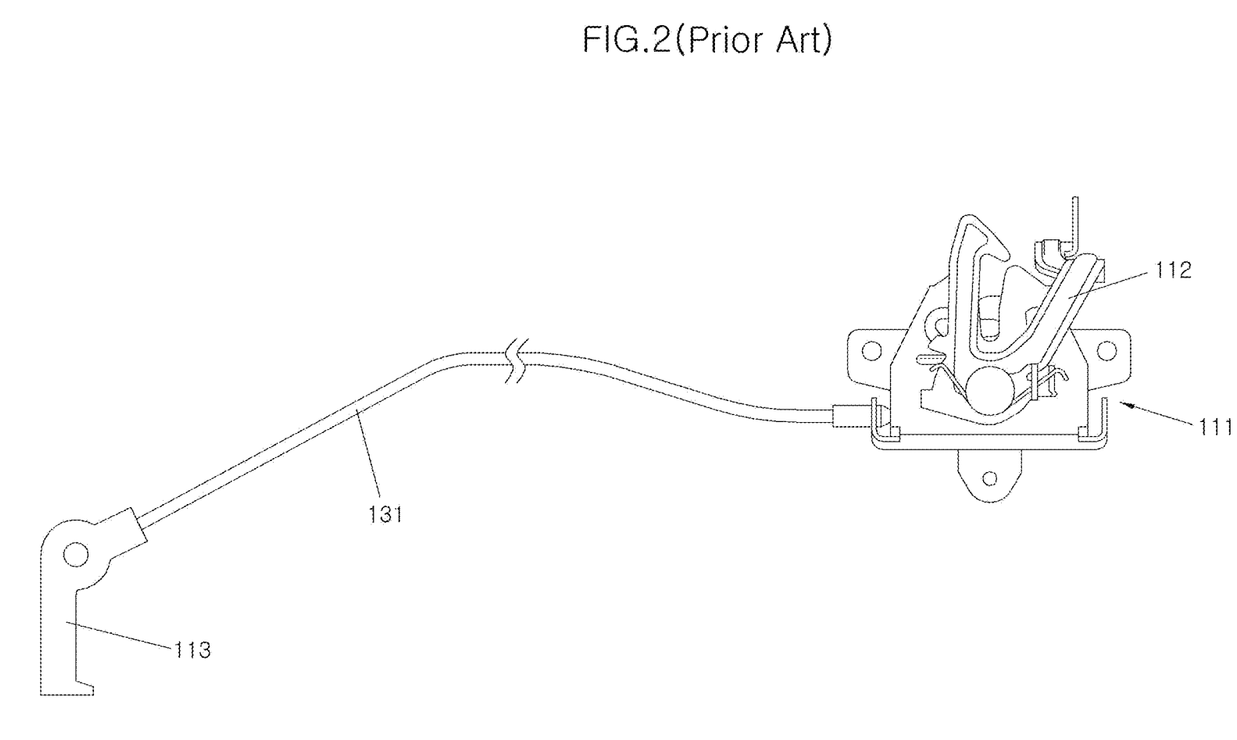
FIG. 2 is a schematic diagram showing a typical hood latch and safety hook.

The hood 3 is provided with a striker. As shown in FIG. 2, the body of the vehicle 1 is provided with a hood latch 111 and a safety hook 112 for restricting the striker. The passenger compartment is provided with a release lever 113 which is connected to the hood latch 111 by a release lever cable 131 to release the hood latch 111.

The hood 3 is configured to be only popped up while the hood latch 111 is released when the release lever 113 is operated and to be opened only when a user releases the safety hook 112 by his/her hand. In this manner, opening the hood 3 is performed in two stages (the hood latch is released, and then the safety hook is released) following regulations by law or the like.

On the other hand, in recent years, the spread of eco-friendly vehicles, for example, electric vehicles, is expanding. Electric vehicles do not require an internal combustion engine and can thus miniaturize devices necessary for driving. Therefore, as shown in FIG. 1, a portion of the engine compartment in the front trunk 2 can be a storage space to hold luggage. In addition, the front trunk 2 can be provided as a storage space even when the engine is located at the rear, like a midship or rear engine (RR) type vehicle.

The front trunk 2 is also opened and closed by using the hood 3.

In addition, in vehicles having the front trunk 2, installing an emergency escape apparatus in the front trunk 2 which can open the hood 3, is also regulated by law.

A trunk lid opening and closing the trunk behind the vehicle is operated by releasing only the latch constraining the trunk lid by a lever operation.

However, two regulations should be applied to the hood 3, which opens and closes the front trunk 2. In other words, the hood 3 should be opened in two stages (the hood latch is released, and then the safety hook is released). After both the hood latch and the safety hook are released, an emergency escape should be able to be made from within the front trunk 2.

In this way, since the two regulations are applied, there is a problem in that the escape from the front trunk 2 is not easy. In other words, when a person trapped in the front trunk 2 cannot recognize the two-stage opening of the hood 3, he/she may try to escape when only the hood latch 111 is released. However, since the hood 3 cannot still be opened due to the safety hook 112, escape is not possible. In addition, even if the two-stage opening of the hood 3 is recognized, the operation of additionally releasing the safety hook 112 should be operated when the hood latch 111 is released. However, there is a problem in that it is difficult to perform the operation when a person is trapped in a confined space, such as the front trunk 2.

SUMMARY OF THE DISCLOSURE

In order to overcome the limitations of the related art, an object of the present disclosure is to provide an opening apparatus of a hood of a vehicle for emergency escape capable of opening the hood that opens and closes a front trunk space by releasing a hood latch and a safety hook by a one-time operation inside a front trunk space.

An opening apparatus of a hood of a vehicle for emergency escape includes a hood latch and a safety hook, which constrains a striker formed on the hood to open and close the hood. The hood opens and closes a front trunk in a vehicle equipped with the front trunk. The opening apparatus includes an emergency lever configured to be installed in the front trunk and an emergency opening mechanism configured to operate the hood latch and the safety hook simultaneously when the emergency lever is operated to release the constraint of the striker.

The emergency lever and the emergency opening mechanism may be connected to each other by an emergency opening cable operating the emergency opening mechanism when the emergency lever is operated.

The emergency opening mechanism may be an operating lever that rotates when the emergency opening cable is pulled. The operating lever may be connected to a latch release cable which is operated to allow the hood latch to release the striker and a hook release cable which is operated to allow the safety hook to release the striker.

The operating lever may have the emergency opening cable connected to one side thereof with respect to a rotation center of the operating lever. The operating lever may have the latch release cable and the hook release cable connected to the other side thereof.

In the operating lever, the latch release cable may be connected closer to a center of the operating lever than the hook release cable.

The emergency opening cable may be connected to the operating lever to pull the operating lever. The latch release cable and the hook release cable are connected to the operating lever to be pulled by the operating lever.

The operating lever may be configured so that a distance from the rotation center of the operating lever to a point where the emergency opening cable is connected is longer than a distance from the rotation center of the operating lever to a point where the latch release cable is connected.

A main bracket may be fastened to one side of the vehicle, and the operating lever may be rotatably installed on the main bracket.

A release lever cable pulled by a release lever operated at the time of normally opening the hood may be connected to the latch release cable.

The release lever cable and the latch release cable may be connected to each other by a connection member. The connection member may be configured so that the release lever cable directly pulls the latch release cable when the release lever is operated. The emergency opening mechanism may pull the latch release cable when the emergency lever is operated.

The connection member may include a head to which the release lever cable is connected and a through portion to which the latch release cable is connected and through which the operating lever penetrates.

The operating lever may be provided with a through hole through which the through portion penetrates.

The head may be positioned at a side connected to the release lever cable in the operating lever.

An inner diameter of the through hole may be formed to be smaller than a length of the head of the connection member.

The emergency lever and the emergency lever bracket may be provided with a rotation holding mechanism, which holds the emergency lever in a rotating state after the emergency lever rotates.

The rotation holding mechanism may be a stop protrusion, which protrudes from one side of the emergency lever, and a support protrusion, which protrudes from one side of the emergency lever bracket and holds the emergency lever in the rotating state by bringing the stop protrusion into contact with the support protrusion when the emergency lever rotates.

According to the opening apparatus of a hood of a vehicle for emergency escape of the present disclosure having the above-described configuration, the hood latch and the safety hook can be simultaneously released by only pulling the release lever, thereby facilitating the escape of the person trapped in the front trunk space.

In addition, the hood latch and the safety hook are opened in two stages in a normal state.

In addition, when the release lever is operated, the release lever is maintained in the operated state, so that the hood can be opened easily.

DESCRIPTION OF SPECIFIC EMBODIMENTS

Hereinafter, an opening apparatus of a hood of a vehicle for emergency escape according to the present disclosure is described with reference to the accompanying drawings.

Figure 3:
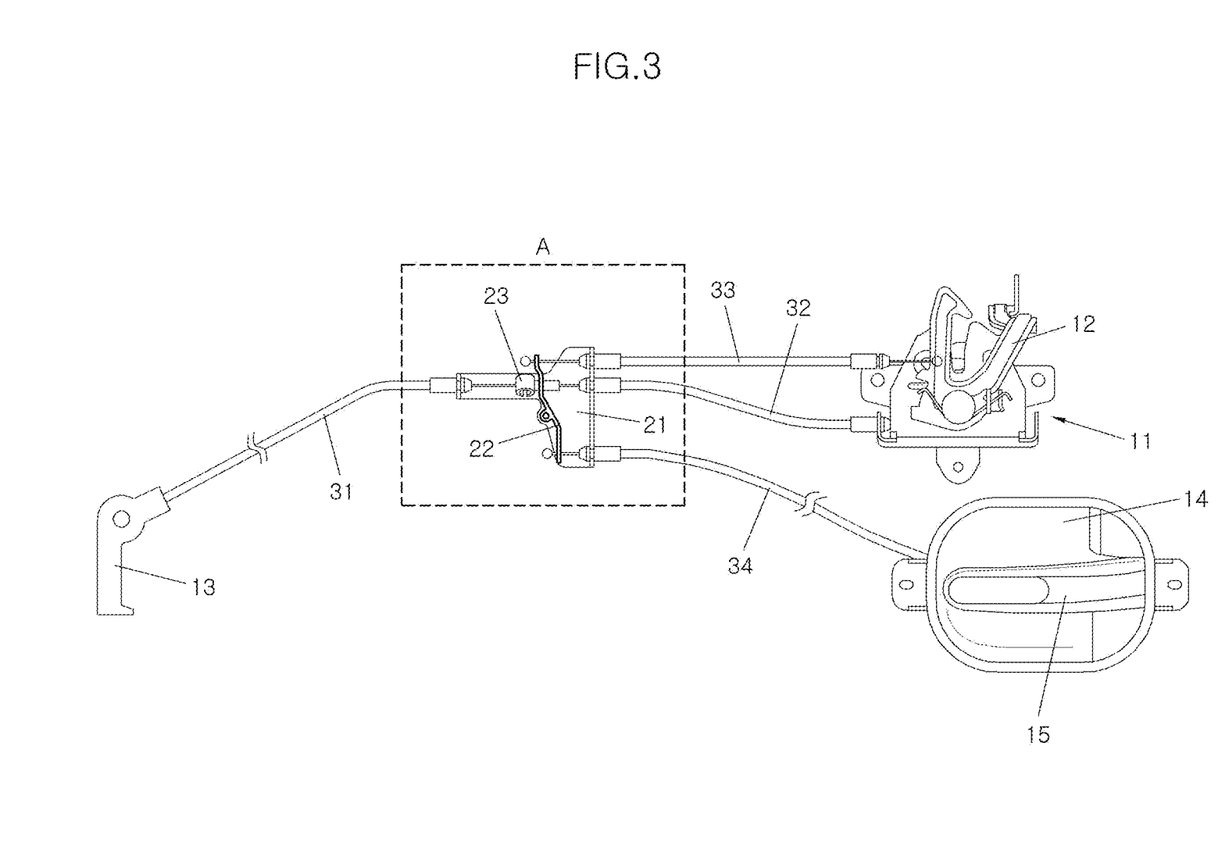
FIG. 3 is a schematic view showing an opening apparatus of a hood of a vehicle for emergency escape according to the present disclosure.

As shown in FIG. 3, an opening apparatus of a hood of a vehicle for emergency escape according to the present disclosure includes a hood latch 11 and a safety hook 12. The safety hook 12 constrains a striker formed or disposed on the hood 3 to open and close the hood 3. The hood 3 is movable to open and close a front trunk 2 in a vehicle equipped with the front trunk 2. In this embodiment, the opening apparatus includes an emergency lever 15 configured to be installed in the front trunk 2 and an emergency opening mechanism configured to operate the hood latch 11 and the safety hook 12 simultaneously when the emergency lever 15 is operated to release the constraint of the striker.

In the vehicle in which the front trunk 2 is or includes a storage space capable of holding luggage and is disposed in the front of the vehicle, the hood 3 is mounted to open and close an upper part or opening of the front trunk 2.

Typically, similar to the hood opening and closing the engine compartment in which the engine is mounted in the front of the vehicle, a rear end of the hood 3 is hinged to a vehicle body of the vehicle 1. A front end thereof is constrained by the hood latch 11 and the safety hook 12.

An interior of the vehicle 1 includes the release lever 13 for opening the hood latch 11. The release lever 13 is connected to the hood latch 11 through the opening apparatus of a hood of a vehicle for emergency escape described below and is operated by a user for releasing the hood latch 11 when the hood 3 is opened normally.

In addition, when the hood 3 is popped up by the operation of the release lever 13, the user operates the safety hook 12 to open the hood 3.

As described above, when the hood 3 is normally opened, the hood 3 is operated by a mechanism such as the typical hood opening apparatus.

However, in an emergency, the hood latch 11 and the safety hook 12 are released by a one-time operation.

The hood latch 11 and the safety hook 12 have the same configuration as a typical hood latch 11 and a safety hook 12. However, the hood latch 11 is not directly connected to the release lever 13 and the release lever cable 31 but is connected to a latch release cable 32 described below. In addition, the safety hook 12 can be opened by a user. One side of the safety hook 12 is connected to a hook release cable 33 described below to rotate even when the hook release cable 33 is operated to release the striker.

The emergency lever 15 is installed inside the front trunk 2 of the vehicle. The emergency lever 15 is rotatably installed in an emergency lever bracket 14 for installing the emergency lever 15 in the front trunk 2.

If a person is trapped in the front trunk 2, the emergency lever 15 is operated to allow the person to escape from the front trunk 2.

When the emergency lever 15 is operated, the emergency opening mechanism simultaneously operates the hood latch 11 and the safety hook 12 so that the constraint of the striker is released at one time.

The emergency opening mechanism is connected to the emergency opening cable 34, which is operated by the emergency opening mechanism when the emergency lever 15 is operated.

An example of the emergency opening mechanism may be an operating lever 22, which is rotatably installed.

The operating lever 22 is rotatably installed on the vehicle body. For example, a main bracket 21 may be fastened to one side of the vehicle, e.g., the front trunk 2. The operating lever 22 may be rotatably installed on the main bracket 21. The main bracket 21 is also used to fix the cables, which are required to operate the hood latch 11 and the safety hooks 12.

The operating lever 22 has the emergency opening cable 34 connected to one side thereof with respect to a rotation center of the operating lever 22. The operating lever 22 also has the latch release cable 32 and the hook release cable 33 connected to the other side thereof, in which the latch release cable 32 is operated to allow the hood latch 11 to release the striker. The hook release cable 33 is operated to allow the safety hook 12 to release the striker.

When the emergency opening cable 34 is operated while the latch release cable 32, the hook release cable 33, and the emergency opening cable 34 are connected to the operating lever 22, the operating lever 22 rotates. When the operating lever 22 rotates, the operating lever 22 pulls the latch release cable 32 and the hook release cable 33 to operate the hood latch 11 and the safety hook 12. Since the latch release cable 32 and the hook release cable 33 are simultaneously pulled when the operating lever 22 rotates, the hood latch 11 and the safety hook 12 substantially release the constraint of the striker simultaneously.

The release lever cable 31, the latch release cable 32, the hook release cable 33, and the emergency opening cable 34 are formed in a structure in which wires are slidably installed inside a tube. A substantial operating force is transmitted by pulling the wires to operate the hood latch 11 and the safety hook 12.

The latch release cable 32, the hook release cable 33, and the emergency opening cable 34 are positioned on the same side (right side in FIG. 4) of the operating lever 22, and the release lever cable 31 is positioned on the opposite side (left side in FIG. 4) thereof.

Figure 4:
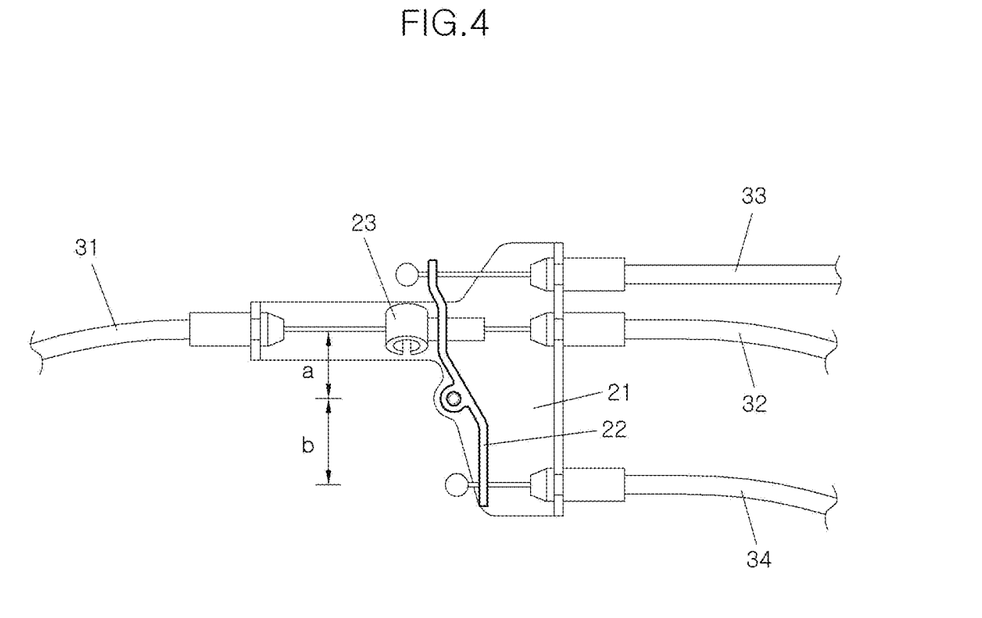
FIG. 4 is an enlarged view of main parts of the opening apparatus of a hood of a vehicle for emergency escape according to the present disclosure.

In addition, the latch release cable 32 in the operating lever 22 is connected closer to the center of the operating lever 22 than the hook release cable 33.

As shown in FIG. 4, a distance 'b' from the rotation center of the operating lever 22 to a point where the emergency opening cable 34 is connected is formed to be longer than a distance 'a' (a<b) from the rotation center of the operating lever 22 to a point where the latch release cable 32 is connected. This is because the operating force by the emergency lever 15 is larger than the operating force required to release the hood latch 11 by operating the release lever 13. This is because the operating force by the operation of the emergency lever 15 should open not only the hood latch 11 but also the safety hook 12.

The latch release cable 32 is connected to the release lever cable 31 so that the operating force of the release lever 13 can be transmitted to the hood latch 11 when the hood 3 is normally opened.

However, a connection member 23 is provided at a portion where the release lever cable 31 and the latch release cable 32 are connected to each other.

The connection member 23 is configured so that the release lever cable 31 directly pulls the latch release cable 32 when the release lever 13 is operated (when the release lever 13 is normally opened). The emergency opening mechanism pulls the latch release cable 32 when the emergency lever 15 is operated (when the emergency lever 15 is emergency opened).

Figure 7:
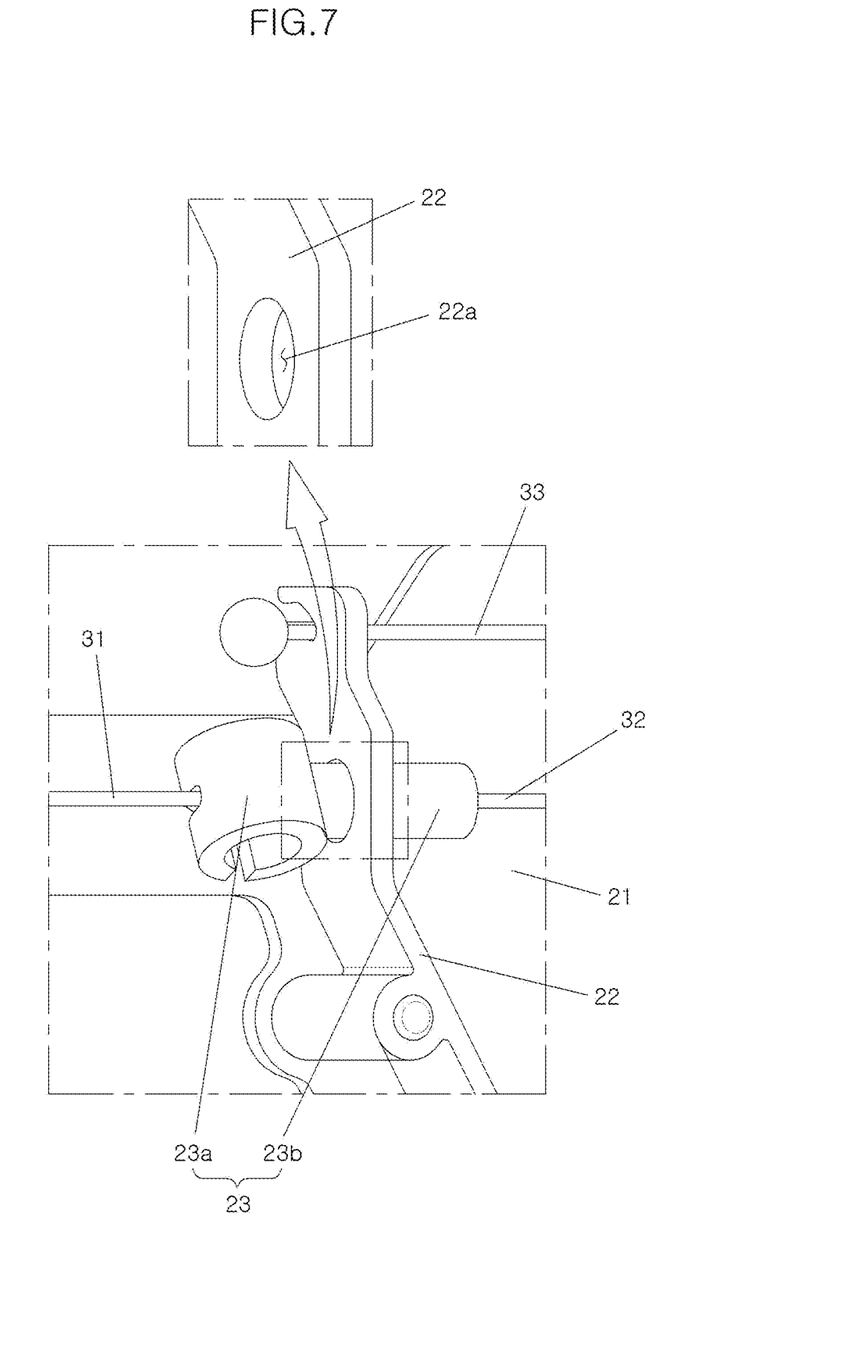
FIG. 7 is a perspective view showing a relationship between an operating lever and an interlocking member in the opening apparatus of a hood of a vehicle for emergency escape according to the present disclosure.

Referring to FIG. 7, the connection member 23 is formed in a T-letter shape and includes a head 23a connected to the release lever cable 31 and a through portion 23b connected to the latch release cable 32.

The head 23a is positioned on the side connected to the release lever cable 31 in the operating lever 22. The connection member 23 pulls the latch release cable 32 while being pushed by the rotation of the operating lever 22 when the operating lever 22 is operated by operating the emergency lever 15, and pulls the latch release cable 32 while being pulled by the release lever cable 31 when the release lever cable 31 is pulled by operating the release lever 13.

The connection member 23 is easily separated from the operating lever 22 at the time of the normal operation, and therefore an inner diameter of a through hole 22a is formed to be larger than an outer diameter of a through portion 23b of the connection member 23.

In addition, the connection member 23 should be pushed by the operating lever 22 when the emergency lever 15 is operated and should not penetrate through the through hole 22a, such that the inner diameter of the through hole 22a is formed to be smaller than a length of the head 23a of the connection member 23.

On the other hand, the main bracket 21 also serves to fix one side of the release lever cable 31, the latch release cable 32, the hook release cable 33 and the emergency opening cable 34.

After the emergency lever 15 is operated (rotated) by the user, the emergency lever 15 should be kept rotated so that a person trapped in the front trunk 2 can push up the hood 3. To this end, the emergency lever 15 and the emergency lever bracket 14 equipped with the emergency lever 15 are provided with a rotation holding mechanism for holding the rotation state after the emergency lever 15 rotates.

Figure 8:
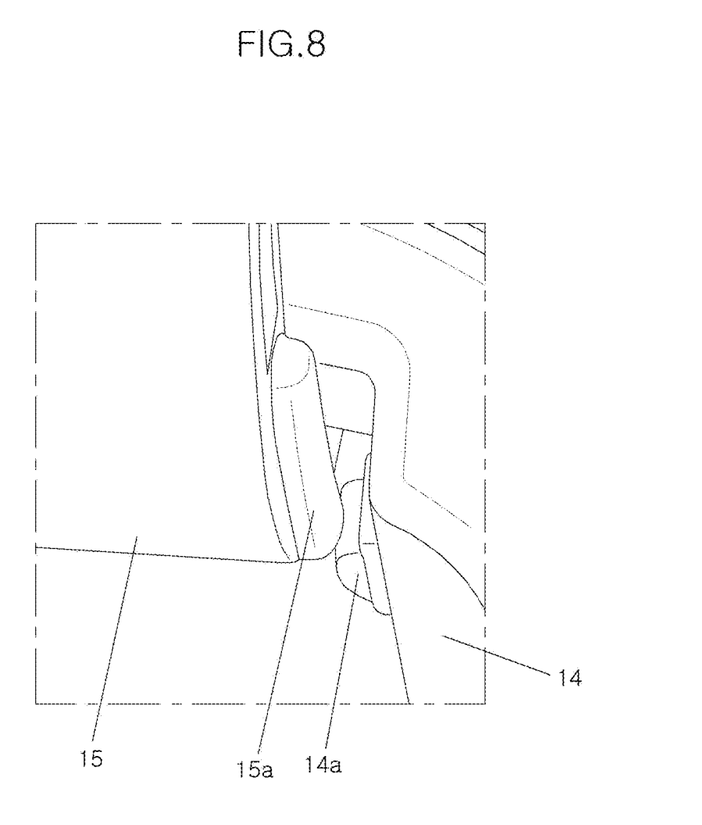
FIG. 8 is an enlarged view of main parts of an emergency lever and an emergency lever bracket in the opening apparatus of a hood of a vehicle for emergency escape according to the present disclosure.

Referring to FIG. 8, in this embodiment of the rotation holding mechanism, a support protrusion 14a and a stop protrusion 15a, which are respectively formed to protrude from the emergency lever bracket 14 and the emergency lever 15, may be used. The support protrusion 14a and the stop protrusion 15a have end portions formed in a round shape, and thus when the stop protrusion 15a contacts the support protrusion 14a, the emergency lever 15 and the emergency lever bracket 14 are in contact with each other by interference fit, such that the emergency lever 15 is maintained in a rotating state.

The opening apparatus of a hood of a vehicle for emergency escape according to the present disclosure having the above configuration is described below.

Figure 5:
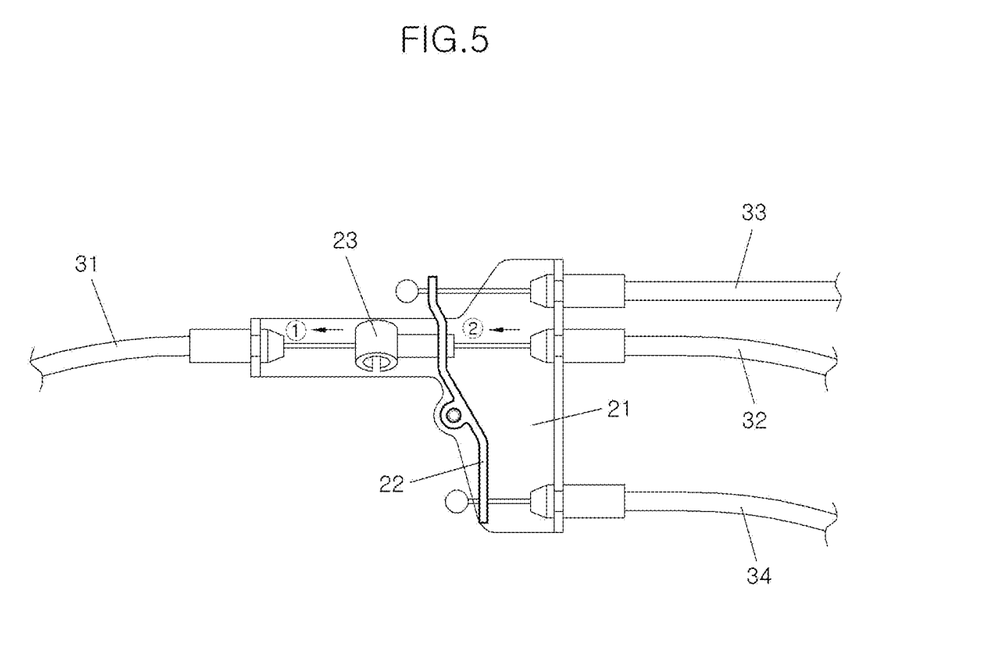
FIG. 5 is an enlarged view of main parts of the opening apparatus of a hood of a vehicle for emergency escape according to the present disclosure at the time of a normal operation.

In the normal case, the hood latch 11 is released by pulling the release lever 13 installed in the vehicle compartment of the vehicle for maintenance or the like (see FIG. 5).

When the release lever 13 installed in the vehicle compartment is pulled, the end portion of the release lever cable 31 pulls a connecting member 23 while the release lever cable 31 is pulled. Since the connecting member 23 is provided to pass through the operating lever 22, the connecting member 23 moves while being separated from the operating lever 22. When the connecting member 23 is pulled, the latch release cable 32 is also pulled together (see (1) and (2) in FIG. 5).

When the latch release cable 32 is pulled, the constraint of the striker is released from the hood latch 11 and the hood 3 is popped up while the hood latch 11 is released.

Thereafter, the user puts his/her hand between the hood 3 and the vehicle body to operate the safety hook 12, such that the safety hook 12 releases the constraint of the striker.

Therefore, in the normal case, the release lever 13 is operated to primarily open the hood latch 11 and the safety hook 12 is operated by the user's hand to secondarily open the hood 3.

The release lever 13 and the hood latch 11 are not one cable but separated into the release lever cable 31, the connecting member 23, and the latch release cable 32, but the whole operation is substantially the same as the operation of the typical hood latch and the safety hook.

Figure 6:
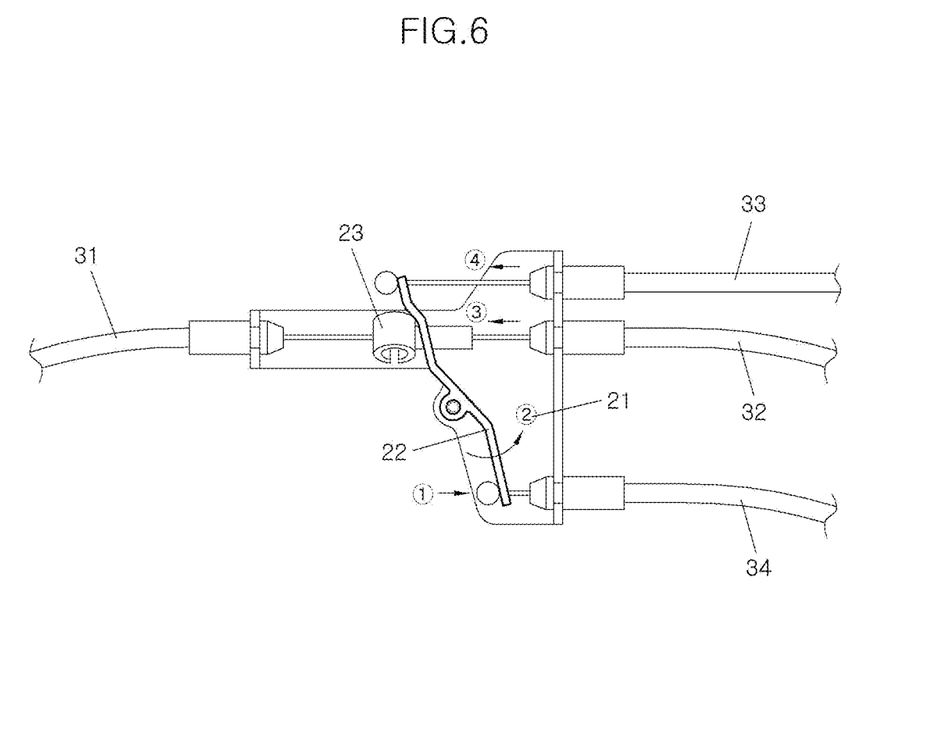
FIG. 6 is an enlarged view of main parts of the opening apparatus of a hood of a vehicle for emergency escape according to the present disclosure at the time of an emergency operation.

On the other hand, FIG. 6 shows an enlarged view of main parts of the opening apparatus of a vehicle operating in a state of emergency.

When the emergency lever 15 installed in the front trunk 2 is operated, the operating lever 22 rotates (see (2) in FIG. 6) while the emergency opening cable 34 connected to the emergency lever 15 is pulled toward the emergency lever 15 (see (1) in FIG. 6).

When the operating lever 22 rotates, the latch release cable 32 and the hook release cable 33 connected to the emergency opening cable 34 on the opposite side to the emergency opening cable 34 are pulled from the operating lever 22 (see (3) and (4) in FIG. 6).

When the latch release cable 32 is pulled, the hood latch 11 releases the striker. At the same time, when the hook release cable 33 is pulled, the safety hook 12 connected to the other end of the hook release cable 33 rotates to release the striker.

In addition, when the emergency lever 15 is operated, the stop protrusion 15a of the emergency lever 15 is prevented from being rotated by the support protrusion 14a of the emergency lever bracket 14. When the emergency lever 15 rotates by the operation, the emergency lever 15 and the emergency lever bracket 14 are fitted in the interference fit with each other while the stop protrusion 15a contacts the support projection 14a, such that the emergency lever 15 is maintained in the rotating state.

As described above, since the hood latch 11 and the safety hook 12 which are constraining the striker are released and the emergency lever 15 is maintained in the operated state, a person trapped in the front trunk 2 may push up the hood 3 to open the hood 3. When the hood 3 is opened, the person can escape from the front trunk 2.

What is claimed is:

1. An opening apparatus of a hood of a vehicle for emergency escape, the opening apparatus including a hood latch and a safety hook, which constrains a striker formed on the hood to open and close the hood, which opens and closes a front trunk in the vehicle, the opening apparatus comprising:
    an emergency lever configured to be installed in the front trunk; and
    an operating lever configured to operate the hood latch and the safety hook simultaneously when the emergency lever is operated to release the constraint of the striker,
    wherein the emergency lever and the operating lever are connected to each other by an emergency opening cable operating the operating lever when the emergency lever is operated,
    wherein the operating lever rotates when the emergency opening cable is pulled,
    wherein the operating lever is connected to a latch release cable, which is operated to allow the hood latch to release the striker and a hook release cable, which is operated to allow the safety hook to release the striker, and
    wherein the operating lever has the emergency opening cable connected to one side thereof with respect to a rotation center of the operating lever and has the latch release cable and the hook release cable connected to the other side thereof.

2. The opening apparatus of claim 1, wherein, in the operating lever, the latch release cable is connected closer to a center of the operating lever than the hook release cable.

3. The opening apparatus of claim 1, wherein the emergency opening cable is connected to the operating lever to pull the operating lever, and wherein the latch release cable and the hook release cable are connected to the operating lever to be pulled by the operating lever.

4. The opening apparatus of claim 1, wherein the operating lever is configured so that a distance from the rotation center of the operating lever to a point where the emergency opening cable is connected is longer than a distance from the rotation center of the operating lever to a point where the latch release cable is connected.

5. The opening apparatus of claim 1, wherein a main bracket is fastened to one side of the vehicle and the operating lever is rotatably installed on the main bracket.

6. The opening apparatus of claim 1, wherein a release lever cable pulled by a release lever operated at the time of normally opening the hood is connected to the latch release cable.

7. The opening apparatus of claim 6, wherein the release lever cable and the latch release cable are connected to each other by a connection member,
    wherein the connection member is configured so that the release lever cable directly pulls the latch release cable when the release lever is operated, and
    wherein the operating lever pulls the latch release cable when the emergency lever is operated.

8. The opening apparatus of claim 7, wherein the connection member comprises:
    a head to which the release lever cable is connected, and
    a through portion to which the latch release cable is connected and through which the operating lever penetrates.

9. The opening apparatus of claim 8, wherein the operating lever is provided with a through hole through which the through portion penetrates.

10. The opening apparatus of claim 9, wherein the head is positioned at a side connected to the release lever cable in the operating lever.

11. The opening apparatus of claim 10, wherein an inner diameter of the through hole is formed to be smaller than a length of the head of the connection member.

12. The opening apparatus of claim 1, wherein the emergency lever and an emergency lever bracket are provided with a rotation holding mechanism which holds the emergency lever in a rotating state after the emergency lever rotates.

13. The opening apparatus of claim 12, wherein the rotation holding mechanism has a stop protrusion, which protrudes from one side of the emergency lever, and a support protrusion, which protrudes from one side of the emergency lever bracket, and wherein the rotation holding mechanism holds the emergency lever in the rotating state by bringing the stop protrusion into contact with the support protrusion when the emergency lever rotates.

14. An opening apparatus of a hood of a vehicle for emergency escape, the opening apparatus including a hood latch and a safety hook, which constrains a striker formed on the hood to open and close the hood, which opens and closes a front trunk in the vehicle, the opening apparatus comprising:
- an emergency lever configured to be installed in the front trunk; and
- an operating lever configured to operate the hood latch and the safety hook simultaneously when the emergency lever is operated to release the constraint of the striker,
- wherein the emergency lever and the operating lever are connected to each other by an emergency opening cable operating the operating lever when the emergency lever is operated,
- wherein the operating lever rotates when the emergency opening cable is pulled,
- wherein the operating lever is connected to a latch release cable, which is operated to allow the hood latch to release the striker and a hook release cable, which is operated to allow the safety hook to release the striker,
- wherein the emergency lever and an emergency lever bracket are provided with a rotation holding mechanism, which holds the emergency lever in a rotating state after the emergency lever rotates, and
- wherein the rotation holding mechanism has a stop protrusion, which protrudes from one side of the emergency lever, and a support protrusion, which protrudes from one side of the emergency lever bracket, and wherein the rotation holding mechanism holds the emergency lever in the rotating state by bringing the stop protrusion into contact with the support protrusion when the emergency lever rotates.

* * * * *